United States Patent
Coleman et al.

(10) Patent No.: US 11,223,601 B2
(45) Date of Patent: Jan. 11, 2022

(54) NETWORK ISOLATION FOR COLLABORATION SOFTWARE

(71) Applicant: L3 Technologies, Inc., New York, NY (US)

(72) Inventors: Glenn Coleman, Berwyn, PA (US); Peter Martz, Marlton, NJ (US); Kenneth Moritz, Lansdowne, PA (US)

(73) Assignee: L3 Technologies, Inc., New York, NY (US)

( * ) Notice: Subject to any disclaimer, the term of this patent is extended or adjusted under 35 U.S.C. 154(b) by 0 days.

(21) Appl. No.: 16/141,535

(22) Filed: Sep. 25, 2018

(65) Prior Publication Data

US 2019/0097971 A1 Mar. 28, 2019

Related U.S. Application Data

(60) Provisional application No. 62/564,371, filed on Sep. 28, 2017.

(51) Int. Cl.
  *G06F 21/53* (2013.01)
  *G06F 21/51* (2013.01)
  (Continued)

(52) U.S. Cl.
  CPC .......... *H04L 63/0209* (2013.01); *G06F 21/53* (2013.01); *G06F 21/606* (2013.01);
  (Continued)

(58) Field of Classification Search
  None
  See application file for complete search history.

(56) References Cited

U.S. PATENT DOCUMENTS 7,150,040 B2 12/2006 Brownell
7,467,408 B1 12/2008 O'Toole, Jr.
(Continued)

FOREIGN PATENT DOCUMENTS

RU 2406138 C1 12/2010

OTHER PUBLICATIONS

A secure architecture design based on application isolation, code minimization and randomization. Gupta et al. IEEE. (Year: 2013).*
(Continued)

*Primary Examiner* — Venkat Perungavoor
(74) *Attorney, Agent, or Firm* — Condo Roceia Koptiw LLP

(57) ABSTRACT

Methods and systems are disclosed for isolation of collaboration software on a host computer system. A networked computer system may include a network, a first host computer system, a border firewall and/or a web proxy. The host computer system may be configured to run a collaboration software application or process that enables interaction with one or more other host computer systems. The collaboration software application or process may be run within an untrusted memory space. The collaboration software application or process may enable interaction between a second host computer system and the untrusted memory space such that the second host computer system may access meeting data within a sandboxed computing environment operating within the untrusted memory space.

16 Claims, 4 Drawing Sheets

(51) Int. Cl.
*H04L 29/06* (2006.01)
*G06F 21/60* (2013.01)
*G06F 21/62* (2013.01)
*G06F 21/71* (2013.01)

(52) U.S. Cl.
CPC ........ *G06F 21/629* (2013.01); *H04L 63/0281* (2013.01); *H04L 63/0876* (2013.01)

(56) References Cited

U.S. PATENT DOCUMENTS

| | | |
|---|---|---|
| 7,478,330 B1 | 1/2009 | Branson et al. |
| 7,694,328 B2 * | 4/2010 | Joshi ................ G06F 21/51 726/2 |
| 7,698,442 B1 | 4/2010 | Krishnamurthy et al. |
| 7,716,720 B1 | 5/2010 | Marek et al. |
| 7,805,516 B2 | 9/2010 | Kettler et al. |
| 7,870,153 B2 | 1/2011 | Croft et al. |
| 7,926,086 B1 | 4/2011 | Violleau et al. |
| 8,090,797 B2 | 1/2012 | Chinta et al. |
| 8,539,561 B2 | 9/2013 | Gupta et al. |
| 8,566,398 B2 * | 10/2013 | Barnier ................ H04L 67/02 709/204 |
| 8,613,070 B1 | 12/2013 | Borzycki et al. |
| 8,769,268 B2 | 7/2014 | Morozov et al. |
| 8,832,833 B2 | 9/2014 | Demopoulos et al. |
| 8,931,054 B2 * | 1/2015 | Huynh ................ G06F 3/0622 380/44 |
| 8,966,464 B1 * | 2/2015 | Christopher ........ G06F 11/0712 717/166 |
| 9,294,492 B1 | 3/2016 | Martini et al. |
| 9,386,021 B1 | 7/2016 | Pratt |
| 9,438,634 B1 | 9/2016 | Ross et al. |
| 9,465,734 B1 | 10/2016 | Myrick et al. |
| 9,531,715 B1 | 12/2016 | Rodgers et al. |
| 9,560,081 B1 | 1/2017 | Woolward |
| 9,602,524 B2 * | 3/2017 | Ghosh ................ G06F 9/45545 |
| 9,609,026 B2 | 3/2017 | Ross et al. |
| 9,680,873 B1 | 6/2017 | Halls et al. |
| 9,729,579 B1 | 8/2017 | Marino et al. |
| 9,787,639 B1 | 10/2017 | Sun et al. |
| 9,864,600 B2 * | 1/2018 | Larimore ................ G06F 9/455 |
| 9,921,860 B1 * | 3/2018 | Banga ................ G06F 9/445 |
| 9,942,198 B2 | 4/2018 | Hoy et al. |
| 10,037,199 B2 | 7/2018 | Hung et al. |
| 10,055,231 B1 | 8/2018 | Li et al. |
| 10,122,703 B2 | 11/2018 | Innes et al. |
| 10,375,111 B2 | 8/2019 | Schultz et al. |
| 10,397,273 B1 | 8/2019 | Stickle et al. |
| 10,521,612 B2 | 12/2019 | Arad et al. |
| 10,554,475 B2 | 2/2020 | Weinstein et al. |
| 10,558,798 B2 | 2/2020 | Weinstein et al. |
| 10,931,669 B2 | 2/2021 | Coleman et al. |
| 2002/0023212 A1 | 2/2002 | Proudler |
| 2002/0040439 A1 | 4/2002 | Kellum |
| 2002/0069366 A1 | 6/2002 | Schoettger |
| 2002/0069369 A1 | 6/2002 | Tremain et al. |
| 2005/0144467 A1 | 6/2005 | Yamazaki |
| 2006/0070066 A1 | 3/2006 | Grobman |
| 2006/0282795 A1 | 12/2006 | Clark et al. |
| 2007/0136579 A1 | 6/2007 | Levy et al. |
| 2007/0220187 A1 | 9/2007 | Kates |
| 2007/0260873 A1 | 11/2007 | Hatfalvi et al. |
| 2008/0016313 A1 | 1/2008 | Murotake et al. |
| 2008/0028401 A1 | 1/2008 | Geisinger |
| 2008/0201711 A1 | 8/2008 | Amir Husain |
| 2008/0256536 A1 | 10/2008 | Zhao et al. |
| 2009/0055924 A1 | 2/2009 | Trotter |
| 2009/0164994 A1 | 6/2009 | Vasilevsky et al. |
| 2009/0172781 A1 | 7/2009 | Masuoka et al. |
| 2009/0249472 A1 | 10/2009 | Litvin et al. |
| 2009/0265760 A1 | 10/2009 | Zhu et al. |
| 2009/0328038 A1 | 12/2009 | Yamada et al. |
| 2010/0138829 A1 | 6/2010 | Hanquez et al. |
| 2010/0138830 A1 | 6/2010 | Astete et al. |
| 2010/0217916 A1 * | 8/2010 | Gao ................ G06F 12/1036 711/6 |
| 2010/0223613 A1 | 9/2010 | Schneider |
| 2010/0251329 A1 | 9/2010 | Wei |
| 2011/0154431 A1 | 6/2011 | Walsh |
| 2011/0299515 A1 | 12/2011 | Robertson et al. |
| 2012/0017213 A1 | 1/2012 | Hunt et al. |
| 2012/0023593 A1 | 1/2012 | Puder et al. |
| 2012/0054744 A1 | 3/2012 | Singh et al. |
| 2012/0265976 A1 | 10/2012 | Spiers et al. |
| 2012/0266149 A1 * | 10/2012 | Lebert ................ G06F 9/44563 717/166 |
| 2013/0132948 A1 | 5/2013 | Hari et al. |
| 2013/0145463 A1 | 6/2013 | Ghosh et al. |
| 2013/0318594 A1 | 11/2013 | Hoy et al. |
| 2014/0040979 A1 * | 2/2014 | Barton ................ G06F 21/604 726/1 |
| 2014/0059642 A1 | 2/2014 | Deasy et al. |
| 2014/0075535 A1 | 3/2014 | Softer et al. |
| 2014/0108558 A1 * | 4/2014 | Borzycki ................ H04L 9/14 709/205 |
| 2014/0115646 A1 | 4/2014 | Rajgopal et al. |
| 2014/0282890 A1 | 9/2014 | Li et al. |
| 2014/0344912 A1 | 11/2014 | Chapman et al. |
| 2014/0351516 A1 * | 11/2014 | Larimore ................ G06F 9/455 711/121 |
| 2014/0380403 A1 * | 12/2014 | Pearson ................ G06F 21/57 726/1 |
| 2015/0106822 A1 * | 4/2015 | Lei ................ G06F 9/4405 718/104 |
| 2015/0156203 A1 | 6/2015 | Giura et al. |
| 2015/0248554 A1 * | 9/2015 | Dumitru ................ G06F 9/45558 726/1 |
| 2015/0281176 A1 | 10/2015 | Banfield |
| 2016/0057167 A1 | 2/2016 | Bach |
| 2016/0134549 A1 | 5/2016 | Abel et al. |
| 2016/0226834 A1 | 8/2016 | Dawson |
| 2016/0246974 A1 | 8/2016 | Broz et al. |
| 2016/0248754 A1 | 8/2016 | Jahr |
| 2016/0292694 A1 | 10/2016 | Goldschlag et al. |
| 2017/0034174 A1 | 2/2017 | Jagers |
| 2017/0076092 A1 | 3/2017 | Kashyap et al. |
| 2017/0142144 A1 | 5/2017 | Weinberger et al. |
| 2017/0180413 A1 | 6/2017 | Petry et al. |
| 2017/0206351 A1 | 7/2017 | Jay et al. |
| 2017/0208067 A1 | 7/2017 | Sriramakrishnan |
| 2017/0250997 A1 | 8/2017 | Rostamabadi et al. |
| 2017/0293432 A1 * | 10/2017 | Oldcorn ................ G06F 3/064 |
| 2017/0317978 A1 | 11/2017 | Diaz-Cuellar et al. |
| 2017/0353496 A1 * | 12/2017 | Pai ................ H04L 12/4641 |
| 2017/0359309 A1 | 12/2017 | Bolte et al. |
| 2018/0027006 A1 | 1/2018 | Zimmermann et al. |
| 2018/0115519 A1 | 4/2018 | Bonomi et al. |
| 2018/0139178 A1 | 5/2018 | Gan |
| 2018/0196945 A1 | 7/2018 | Kornegay et al. |
| 2018/0198824 A1 | 7/2018 | Pulapaka et al. |
| 2018/0203995 A1 | 7/2018 | Yuen et al. |
| 2018/0234422 A1 | 8/2018 | Odom et al. |
| 2018/0276396 A1 | 9/2018 | Yablokov et al. |
| 2018/0330257 A1 | 11/2018 | Dodson et al. |
| 2018/0367528 A1 | 12/2018 | Schwarz et al. |
| 2019/0097970 A1 | 3/2019 | Coleman et al. |
| 2019/0097972 A1 | 3/2019 | Coleman et al. |
| 2019/0098007 A1 | 3/2019 | Coleman et al. |
| 2019/0098020 A1 | 3/2019 | Martz et al. |
| 2019/0121961 A1 | 4/2019 | Coleman et al. |
| 2019/0121962 A1 | 4/2019 | Coleman et al. |
| 2019/0213325 A1 | 7/2019 | McKerchar et al. |

OTHER PUBLICATIONS

Impact & Analysis of Virtual Workspace on Grid Computing. Yadav et al. IJST. (Year: 2011).*
Design and Implementation of Sandbox Technique for Isolated Applications. Haq et al. IEEE. (Year: 2016).*
SICE: A Hardware-Level Strongly Isolated Computing Environment for x86 Multi-core Platforms. Azab. ACM. (Year: 2011).*

(56) References Cited

OTHER PUBLICATIONS

Native Client: A Sandbox for Portable, Untrusted x86 Native Code. Yee. IEEE. (Year: 2009).*
Enforcing Least Privilege Memory Views for Multithreaded Applications. Hsu. ACM. (Year: 2016).*
Thwarting Memory Disclosure with Efficient Hypervisor-enforced Intra-domain Isolation. Liu. ACM. (Year: 2015).*
Shreds: Fine-grained Execution Units with Private Memory. Chen. IEEE. (Year: 2016).*
Trellis: Privilege Separation for Multi-user Applications Made Easy. Mambretti. Springer. (Year: 2016).*
Iso-X: A Flexible Architecture for Hardware-Managed Isolated Execution. Evtyushkin. IEEE. (Year: 2014).*
Barnet, Mark, "Praktikum Po Zaschite Seti Kompanii", Windows IT Pro/RE, Nov.-Dec. 2006, pp. 79-81.
Burnett, Mark, "How I Secured One Company's Network", Using Log Parser, Virtualization, and A Little Psychology, Sep. 17, 2006, 4 pages.
Laverick, Mike, "Hypervisor Management and Optimization for Advanced Virtualization", E-book, TechTarget, 2010, 13 pages.
Li et al., "VSITE: A Scalable and Secure Architecture for Seamless L2 Enterprise Extension in the Cloud", 6th IEEE Workshop on Secure Network Protocols (NPSec), Oct. 2010, pp. 31-36.
Reuben, Jenni Susan, "A Survey on Virtual Machine Security", TKK T-110.5290 Seminar on Network Security, Oct. 11-12, 2007, 5 pages.
Villeneuve, Nart, "Command and Control in the Cloud", Malware Explorer, Oct. 22, 2010, 3 pages.
Wikipedia, "Computer Networking", Available at https://en.wikipedia.org/wiki/Computer_network, Dec. 2010, 19 pages.
Wikipedia, "Computer Security", Available at https://en.wikipedia.org/wiki/Computer_security, retrieved on Dec. 2010, 27 pages.
Wikipedia, "Cyber Security Standards", Available at https://en.wikipedia.org/wiki/Cyber_security_standards, retrieved on Dec. 2010, 9 pages.
Wikipedia, "HTTP Secure", Available at https://en.wikipedia.org/wiki/HTTPS, retrieved on Dec. 2010, 9 pages.
Wikipedia, "Hypervisor", Available at <https://en.wikipedia.org/wiki/Hypervisor> , retrieved on Dec. 2010, 6 pages.
Wikipedia, "Internet Protocol", Available at https://en.wikipedia.org/wiki/Internet_Protocol, retrieved on Dec. 2010, 5 pages.
Wikipedia, "Multiprotocol Label Switching", Available at <https://en.wikipedia.org/wiki/Multiprotocol_Label_Switching> , retrieved on Dec. 2010, 8 pages.
Wikipedia, "Network Address Translation", Available at https://en.wikipedia.org/wiki/Network_address_translation, Dec. 2010, 12 pages.
Wikipedia, "Security-Focused Operating System", Available at https://en.wikipedia.org/wiki/Security-focused operating system, retrieved on Dec. 2010, 9 pages.
Wikipedia, "Virtual Desktop", Available at https://en.wikipedia.org/wiki/Virtual_desktop, retrieved on Dec. 2010, 5 pages.
Wikipedia, "Virtual Private Network", Available at https://en.wikipedia.org/wiki/Virtual_private_network, retrieved on Dec. 2010, 9 pages.
"NPL Search Term", Web Search History, 1 page.
Bruckman et al., ""Georgia Computes!": Improving the Computing Education Pipeline", Proceeding of the 40th ACM Technical Symposium on Computer Science Education, 2009, pp. 86-90.
Comodo, "Comodo Internet Security", Software Version 7.0, User Guide Version 7.0.111114, 2014, pp. 1-579.
Jauernig et al., "Trusted Execution Environments: Properties, Applications, and Challenges", IEEE Computer and Reliability Societies, Resilient Security, Mar.-Apr. 2020, pp. 56-60.
Jung et al., "An Architecture for Virtualization-Based Trusted Execution Environment on Mobile Devices", 2014 IEEE 11th International Conference on Ubiquitous Intelligence and Computing and 2014 IEEE 11th International Conference on Autonomic and Trusted Computing and 2014 IEEE 14th International Conference on Scalable Computing and Communications and, Associated Symposia/Workshops, 2014, pp. 540-547.
Kostiainen et al., "Dedicated Security Chips in the Age of Secure Enclaves", IEEE Computerand Reliability Societies; Hardware-Assisted Security, Sep.-Oct. 2020, pp. 38-46.
Le et al., "Computing the Real Isolated Points of an Algebraic Hypersurface", International Symposium on Symbolic and Algebraic Computation, Aug. 24, 2020, 12 pages.
Srivastava et al., "Tamper-Resistant, Application-Aware Blocking of Malicious Network Connections", School of Computer Science, Georgia Institute of Technology, 2008, pp. 39-58.

* cited by examiner

NETWORK ISOLATION FOR COLLABORATION SOFTWARE

CROSS-REFERENCE TO RELATED APPLICATION

This application claims the benefit of U.S. Provisional Application Ser. No. 62/564,371, filed Sep. 28, 2017, the contents of which are incorporated by reference herein.

BACKGROUND

The Internet provides access to a large number of systems from which beneficial and/or harmful data may be retrieved by a host computer system attached to and communicating over the Internet. Harmful data that can be accessed through the Internet includes a variety of viral software constructs, generally referred to as malicious software or malware. Malware may be downloaded to a host computer system unintentionally, for example, by and/or without the knowledge of the user of the host computer system.

A host computer system that has downloaded malware may be referred to as an infected host computer system. An infected host computer system may result in possible security losses, reduction of efficiency, and/or malfunctions. Security losses may include, but are not limited to, the loss of some or all data that is accessible by the infected host computer system, the installation of additional malware onto the infected host computer system, and/or the loss of command and control of the infected host computer system. Reduction of efficiency may be incurred from, but not limited to, additional processor demand, additional memory usage, and/or additional network access by the executing malware The security and privacy of the user of the infected host computer system may be compromised by malware. Both information located on the infected host computer system and/or information stored on or communicated via a local area network may be susceptible to attack by the malware. In many instances, an infected host computer may be used by the malware as a vehicle to stage an attack on other network resources that are accessible from the infected host computer system. Such an attack method is often undetected by the user of the host computer system and/or network administrators.

An infected host computer system may lose command and control. The loss of command and control of the infected host computer system may include performing one or more actions the author of the downloaded malware may desire. For example, the malware may perform a reconnaissance of the infected host computer system, determine system privileges, access local files, access security tokens, and/or attempt infection or access of other network resources accessible from the infected computer system

SUMMARY OF THE INVENTION

Methods and systems are disclosed for isolation of multi-user interactive software (e.g., collaboration software) on a host computer system. A host computer system may include a processor and a memory. The host computer system may include a workspace. One or more applications may run in the workspace via a first memory space (e.g., a trusted memory space). The host computer system may include an isolated computing environment. The isolated computing environment may be isolated from the workspace by an internal isolation firewall. The internal isolation firewall may prevent communication between the isolated computing environment and the workspace. The internal isolation firewall may allow communication between the isolated computing environment and the workspace if, for example, the user of the host computer system allows the communication. The host computer system may prompt the user to allow the communication.

One or more isolated applications may run in the isolated computing environment via a second memory space. The isolated applications may have access to one or more Internet destinations (e.g., untrusted Internet destinations), The isolated applications may communicate with the Internet destinations via an authentication device. For example, the authentication device may prevent the multi-user interactive software application from communicating with the Internet destinations until after the isolated computing environment has authenticated with the authentication device.

The isolated applications may include a multi-user interactive software application. A multi-user interactive software application may be an application that allows one or more remote machines to control (e.g., access, view, interact with, download from, upload to, and/or modify) an application running on the host computer system. For example, the multi-user interactive software application may allow the remote machines to view a display of the host computer system (e.g., for a presentation or screen-sharing). The multi-user interactive software application may allow the remote machine to control the host computer system by allowing the remote machines to control a pointer device, a keyboard input, and/or a display of the host computer system.

The host computer system may be configured to connect to a network. For example, the network may be a local area network (LAN), a wide area network (a WAN), a cellular network, a Wi-Fi network, a digital subscribers line (DSL) network, a cloud computing network, a data center, and/or a satellite network. The host computer system may be connected to multiple networks at the same time. For example, the host computer system may be simultaneously connected to a Wi-Fi network and a LAN. The host computer system may run one or more trusted applications in the workspace. The trusted applications may be configured to communicate with one or more trusted machines via the network.

The host computer system may include a host-based firewall. The host-based firewall may be configured to isolate the host computer system from communicating with one or more devices on the network. The host-based firewall may allow the host computer system to communicate with, for example, one or more predetermined network devices using one or more predetermined ports. The host-based firewall may block incoming communications that are sent to the workspace from the network.

A networked computer system may include a network, a first host computer system, a border firewall and/or a web proxy. The host computer system may include a processor and memory. The network may include one or more of a local area network (LAN), a wide area network (WAN), a cellular network, a Wi-Fi network, a digital subscribers line (DSL) network, a cloud computing network, a data center, an ad-hoc network, a satellite network, a cable modem network, and/or the like. The networked computer system may be configured to implement network isolation between one or more untrusted network destinations and the first host computer system. The network isolation may be implemented via one or more of a host-based firewall on the first host computer system, a border firewall around a portion of the network that includes the first host computer system, a web proxy, an internal isolation firewall on the host computer system, and/or a segregation of a trusted memory space and an untrusted memory space.

The first host computer system may be configured to run a collaboration software application or process that enables interaction with one or more other host computer systems. The collaboration software application or process may be run within the untrusted memory space. The collaboration software application or process may enable interaction between a second host computer system and the untrusted memory space such that the second host computer system may access meeting data within a sandboxed computing environment operating within the untrusted memory space. The collaboration software application or process may allow the second host computer system to control the pointer device within the sandboxed computing environment of the first host computer system.

The collaboration software application or process may be configured to allow the second host computer system to control a keyboard input within the sandboxed computing environment of the first host computer system. The collaboration software application or process may be configured to allow the second host computer system to cut and paste data within the sandboxed computing environment of the first host computer system. The collaboration software application or process may be configured to allow the second host computer system to transfer one or more files to and/or from the sandboxed computing environment of the first host computer system.

The host-based firewall may be configured to prevent lateral communication and movement of malware between the first host computer system and other devices on the networked computer system. The web proxy may be configured to prevent unauthorized communication between the first host computer system and the one or more untrusted network destinations. The segregation of the trusted memory space and the untrusted memory space may be enforced by the internal isolation firewall. The first host computer system may be configured to run one or more applications or processes in the trusted memory space that are configured to communicate with one or more trusted devices. The trusted memory space may be a first memory space.

The first host computer system may be configured to enable a plurality of sandboxed computing environments and/or untrusted memory spaces. For example, a first sandboxed computing environment may be configured to enable operation of a collaboration software application. The first sandboxed computing environment may operate within a second memory space. A second sandboxed computing environment may be configured to enable operation of a browser program. The second sandboxed computing environment may operate within a third memory space. The second memory space and the third memory space may be separate untrusted memory spaces.

DETAILED DESCRIPTION

Figure 1:
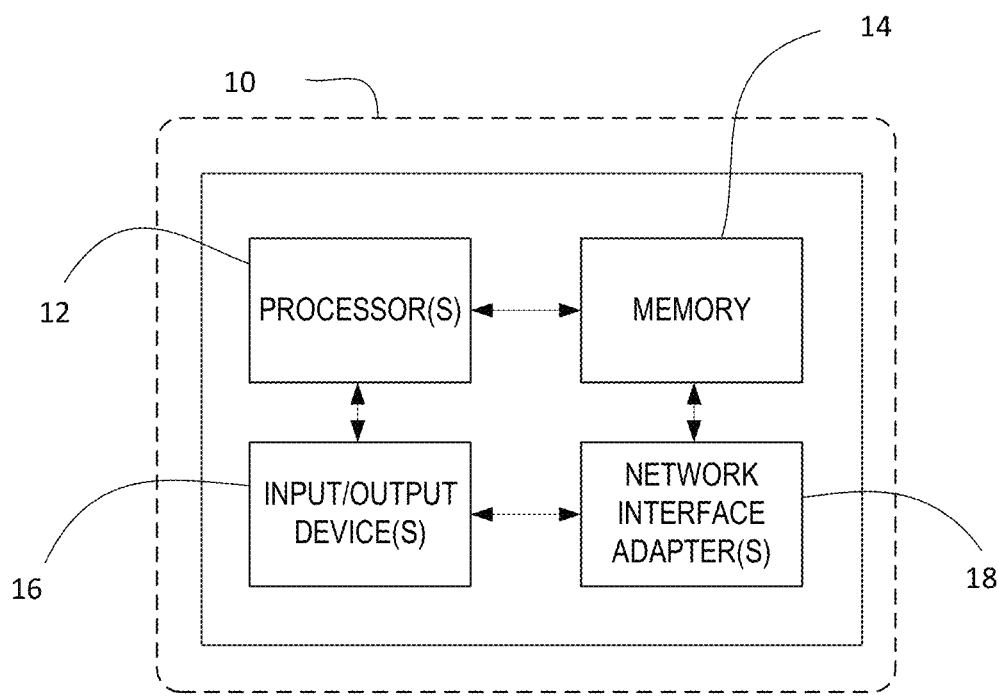
FIG. 1 depicts an example host computer system.

Systems and methods are disclosed for isolation of collaboration software on a host computer system. Isolation of collaboration software may protect the host computer system from collaboration software-based interactions that may bypass other network security controls. For example, isolation of collaboration software may protect the host computer system from one or more of command and control infection, data exfiltration, or general automated infection that can occur from communicating with one or more trusted or untrusted devices via collaboration software. A host computer system may initiate collaboration software to securely browse, access, share data, and/or communicate with untrusted network destinations, including but not limited to resources accessible via the Internet. The host computer system may be a laptop computer, a mobile phone, a tablet, etc. The host computer system may be connected to a network (e.g., a local area network (LAN), a wide area network (WAN), a cellular network, a Wi-Fi network, a digital subscribers line (DSL) network, a cloud computing network, a data center, an ad-hoc network, a satellite network, a cable modem network, etc.). The host computer system may be a physical machine, a virtual machine, or a combination thereof. The isolation may be enforced via the host computer system itself and/or via one or more network entities located within the network.

Systems and methods are described to provide a layer of communication isolation between collaboration software applications and untrusted network destinations in order to prevent malware from effectively exfiltrating data from the host computer system and/or establishing command and control channels with an attacker resources in order to attempt to gain control of the host computer system. The host computer system may isolate the collaboration software from other applications and/or processes operating on the computer system. The collaboration software may be implemented using software that is commercially available, for example, such as WebEx, GoToMeeting, etc.

The terms "collaboration software" and "multi-user interactive software" may be used interchangeably herein. For example, they may refer to software that, when run in an application on a host machine, allows a remote machine to control the host machine via a network (e.g., the Internet). Multi-user interactive software applications may allow information (e.g., files, data objects, etc.) to be transferred from the remote machine to the host machine and vice versa. Examples of collaboration or multi-user software may include screen sharing applications, collaborative meeting applications, remote desktop applications, gaming applications, shared document application, file sharing applications, and/or the like.

Internet isolation, or also known herein as communication isolation may be provided via untrusted memory space segregation. The host computer system may have a sandbox protected application or process and/or an internal isolation firewall running thereon. For example, collaboration software may wholly or partially be contained in a sandboxed computing environment (e.g., an isolated computing environment). As another example, a collaboration software application may instantiate its own sandboxed computing environment, firewall, and/or untrusted memory space. The host computer system may enable use of collaboration software via a web browser and/or a specific collaboration software application. For example, one or more plugins may installed in a web browser to enable use of the collaboration software and/or features. Other isolation methods such as operating the collaboration software applications within a virtual machine may be used.

The sandbox protected application or process may operate within a sandboxed computing environment. The sandboxed computing environment may include resources (e.g., a limited set of resources) allocated for operation of a sandbox container process. The sandboxed computing environment may be enforced via the sandbox container process. The sandbox container process may be a security mechanism used to separate the sandboxed computing environment from other applications and/or processes that may be running on a workspace of the host computer system. The sandboxed container process may be configured to enable one or more applications and/or processes (e.g., such as a collaboration software application and/or process) being executed within the sandboxed computing environment to access the resources allocated for operation of the sandbox container process. For example, the one or more applications and/or processes being operated within the sandboxed computing environment may be allowed to access memory associated with the sandboxed computing environment. The memory associated with the sandboxed computing environment may be separate from memory that is configured to enable storage and operation of the workspace.

The terms "sandboxed computing environment" and "isolated computing environment" may be used interchangeably herein. For example, they may refer to a memory space that is isolated (e.g., by use of an internal isolation firewall) from another memory space (e.g., a workspace). Applications running in the isolated computing environment may be able to interact with one or more Internet resources, for example via one or more proxy servers and/or authentication devices. An isolated computing environment may be implemented using a sandbox container and/or other isolation techniques such as a virtual machine.

The workspace may include one or more processes operating within the operating system that are not restricted by the sandbox container process. The operating system of the host computer system may include a set of resources configured to enable operation of the workspace and the sandbox container process.

The sandbox container process may have access to one or more operating system and/or kernel processes in order to enforce isolation between the workspace associated with the first memory space and the sandboxed computing environment associated with the second memory space. For example, the isolation of the workspace from the sandboxed computing environment may be enforced by an internal isolation firewall. The sandbox container process may enforce the segregation using techniques such as namespace isolation such that processes running in the sandboxed computing environment in the second memory space are restricted from accessing the first memory space including the workspace (e.g., and vice versa). The sandbox container process may restrict access to certain resources by processes running in the sandboxed computing environment. The sandboxed container process may allow the workspace and the sandboxed computing environment to share access to the host operating system and host operating resources (e.g., including the kernel and libraries) while enforcing the segregation of the memory spaces access by the workspace and the sandboxed computing environment. In this manner, the sandbox container process may permit isolation of the sandboxed computing environment without requiring the sandboxed computing environment to boot a separate operating system, load separate libraries, etc., which would require separate private memory for those files.

The one or more processes or applications operating within the sandboxed computing environment may be permitted to access untrusted network destinations via an intermediate connection device. The intermediate connection device may be a web proxy and/or an authentication device, for example. The isolated computing environment may be required to authenticate with the intermediate connection device in order for applications running in the isolated computing environment to communicate with the untrusted network destinations. For example, the multi-user interactive software application may be unable to communicate data until after the isolated computing environment has authenticated with the intermediate connection device.

The one or more processes or applications operating within the sandboxed computing environment may connect to the untrusted network destinations as a dedicated network interface device with using a specific Internet Protocol (IP) address. The one or more processes or applications operating within the sandboxed computing environment may be referred to as sandboxed processes or applications. The host computer system may maintain a list of untrusted network destinations and/or a list of trusted network destinations. The list of trusted network destinations may be a whitelist. The list of untrusted network destinations may be a blacklist. The whitelist and the blacklist may be refined based on username and/or machine identification (ID). For example, the lists of trusted and untrusted network destinations may be different for different users and/or machines associated with a respective network. The whitelist and/or the blacklist may be associated with one or more access levels. For example, a first whitelist and a first blacklist may be assigned to a first access level. An untrusted network destination may be an untrusted resource, an untrusted device, an untrusted website, and/or the like. Since the untrusted network destinations may be sources of malware, the one or more processes or applications operating within the sandboxed computing environment may be allowed to communicate with the untrusted network destination(s), but other communication from the host computer system (e.g., communications originating from outside the sandboxed computing environment such as from within the workspace) to the untrusted network destination(s) may be prevented.

Communication isolation may be provided via a host-based firewall. The host-based firewall may be configured to prevent unauthorized communication between applications and/or processes operating in the workspace of the host computer system to other devices on the network over which the host computer is communicating. The host-based firewall may be configured to block incoming communications to the workspace of the host computer system, except for predetermined trusted devices and/or predetermined network ports. The host-based firewall may allow outgoing communications to be sent from a process in the workspace to a non-web-based (e.g., LAN destination).

Communication isolation may be provided via an internal isolation firewall. The internal isolation firewall may enable separation between the sandboxed computing environment and the workspace. The applications and/or processes operating within the sandboxed computing environment may be prevented from access any additional resources of the host computer system or may be prevented from access any additional resources of the host computer system without explicit user action. For example, the internal isolation firewall may generate a command prompt that enables a user selection if an application and/or process operating within the sandboxed computing environment is requesting access to resources outside of the sandbox memory space. By prompting the user to confirm that the applications and/or processes operating within the sandboxed computing environment are permitted to access additional resources outside the sandbox memory space, malware that is designed to attempt to remain transparent to the user may be limited to operation within the sandboxed computing environment. Thus, the malware within the sandboxed computing environment may be unable to access other resources available to the host system generally, such as local area networks and secure memory regions.

The internal isolation firewall may allow certain actions to be performed with approval of the user of the host system. For example, the internal isolation firewall may prompt the user to allow communication between the workspace and the isolated computing environment. For example, an application and/or process operating within the sandboxed computing environment may be allowed access to the host system to perform one or more of a cut or copy of data, a paste of data, a printing of data to a local printer, a file transfer, and/or the like. The host computer system may prevent one or more other transfers of data between the sandboxed computing environment and the workspace except those user initiated actions described herein. For example, the sandbox container process may prevent unauthorized data transfers between the sandboxed computing environment and the workspace.

FIG. 1 illustrates an example of a host computer system that may implement one or more applications in a sandboxed environment. For example, a Host Computer System 10 may include one or more Processor(s) 12, Memory 14, one or more Input and/or Output (I/O) Devices 16, and one or more Network Interface Adapter(s) 18. Generally, the Host Computer System 10 may be any computing device capable of communicating over a network and/or performing processing tasks. Although the examples set forth herein may be described in terms general purpose computing workstations, the systems and methods disclosed herein may be equally applicable to any computing device or communication device for which internet isolation is desired. For example, the systems and methods disclosed herein may be applicable for providing sandbox based internet isolation for cell phones, pagers, personal computers (PCs), laptops, vehicles, kiosks, facilities, servers, workstations, tablets, smartphones, routers, controllers, microcontrollers, and/or any other processing and/or communication device.

Processor(s) 12 may include one or more of a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGA) circuits, any other type of integrated circuit (IC), a state machine, and/or the like. The Processor(s) 12 may perform data processing, input/output processing, instantiate operating system(s), execute application(s), and/or any other functionality that enables the use of sandbox isolation of one or more applications and/or processes.

Memory 14 may include volatile and/or non-volatile memory. Memory 14 may include read-only memory (ROM), random access memory (RAM), a register, cache memory, semiconductor memory devices, magnetic media such as, but not limited to, internal hard disks and removable disks, magneto-optical media, and/or optical media such as CD-ROM disks, and/or digital versatile disks (DVDs), and/or the like. Memory 14 may be configured to store computer readable instructions that when implemented by Processor(s) 12 may cause Processor(s) 12 to implement one or more of the functions or procedures described herein. For example, Memory 14 may be configured to store software code implemented by Processor(s) 12 that instantiate a restricted operating system environment for operation of the sandboxed browser and/or other sandboxed applications(s) and/or process(es). The software may restrict sandbox-based access to one more file descriptors, memory, file system space, etc. For example, the applications and/or processes operating within the sandboxed computing environment may be permitted to certain portions of Memory 14 but may not be allowed access to other portions of Memory 14. As an example, Memory 14 may be partitioned into a first memory space and a second memory space. The first memory space may be configured to enable storage and/or operation of a workspace configured to execute a first set of one or more applications and/or processes running on the operating system of the Host Computer System 10. The second memory space may be configured to enable storage and/or operation of a second set of one or more applications and/or processes running within the sandboxed computing environment. The sandboxed computing environment may be enforced via a sandbox container process. The sandbox container process may segregate the workspace associated with the first memory space from the sandboxed computing environment associated with the second memory space. For example, the sandbox container process may include an internal isolation firewall. The internal isolation firewall may enforce the segregation of the first and second memory spaces.

The Host Computer System 10 may include I/O Device(s) 16. The I/O Devices 16 may include one or more of a monitor, keyboard, mouse, touchscreen interface, digital camera, a digital display, a graphical user interface, and/or the like. The I/O Device(s) 16 can allow user interaction with the Host Computer System 10, for example to allow certain interactions between an application or a process operating within the sandboxed computing environment and non-sandboxed resources.

The Network Interface Adapter(s) 18 may be configured to allow communication between the Host Computer System 10 and other devices. The Network Interface Adapter(s) 18 may include one or more wired and/or wireless communication devices.

The sandbox container process may be configured to protect the host computer system from one or more malware toolsets. For example, the Network Interface Adapter(s) 18 may include one or more of a modem, Ethernet adapter, radio, wired and/or wireless transceiver, computer port, network socket, network interface controller, and/or the like. The Processor(s) 12 may maintain rules related to access to the Network Interface Adapter(s) 18 for both access via the sandboxed computing environment and via the workspace. Further, the Processor(s) 12 may enforce a host-based firewall that implements additional rules related to access to the Network Interface Adapter(s) 18.

As described herein, a sandbox protected application or process may be used for communicating with untrusted sources, such as Internet based resources. In this manner, if malware is transferred back to the host computer system due to interactions with the untrusted source, the malware may be isolated to the sandboxed computing environment, which may make it difficult for the malware to infect the workspace of the host computer system. For example, the sandbox container process may prevent the malware toolset from performing a reconnaissance of the host computer system to assess what data is available from the host computer system, such as computing resources, files, network information, additional network connectivity, etc. The sandbox container process (e.g., the internal isolation firewall) may prevent the data on the host computer system from being reported back to the remote device that sent the malware to the host computer and/or any other remote devices.

The sandbox container process may prevent the malware toolset from determining user system privileges of the host computer system, which can be used to access data on any associated network or local area network. For example, applications and/or processes operating within the sandboxed computing environment may not have access and/or authorization to such host computer configurations.

The sandbox container process may prevent the malware toolset from accessing local files stored on the host computer system. For example, the sandbox container process may isolate the first memory space from the second memory space. Such isolation can help prevent the malware from attempting to transmit such information back to the remote device that is the source of the malware. For example, the malware toolset may attempt to transmit a local security database from which additional user credentials can be derived, including potential privileged user credentials. These user credentials may be used by the malware to attempt to gain access to other resources on any associated network or the local area network. Where the user credentials are for a privileged user account, these credentials may be used to gain privileged access to other resources on any associated network or local area network.

The sandbox container process may prevent the malware toolset from accessing a security token and/or hash of the host computer user from the memory of the host computer system and/or a network data stream. This security token or hash can be used to gain access to other resources on any associated network or the local area network. Where the security token or hash is for a privileged user account, this security token or hash may be used to gain privileged access to other resources on any associated network or local area network.

The sandbox container process may prevent the malware toolset from enabling remote control and/or access of the host computer system by a remote device that is unknown to the user. When malware enables remote control and/or access, the remote device may be able to control one or more (e.g., all) operations of an infected host computer system and perform whatever alternative uses that an enslaved, infected host computer system can perform. For example, a remote device may download additional data to an infected host computer system, access other websites for denial of service attacks, and/or convert the infected host computer system into a source of malicious software from which toolsets or secondary payloads are downloaded to other, subsequently infected, host computer systems.

Figure 2:
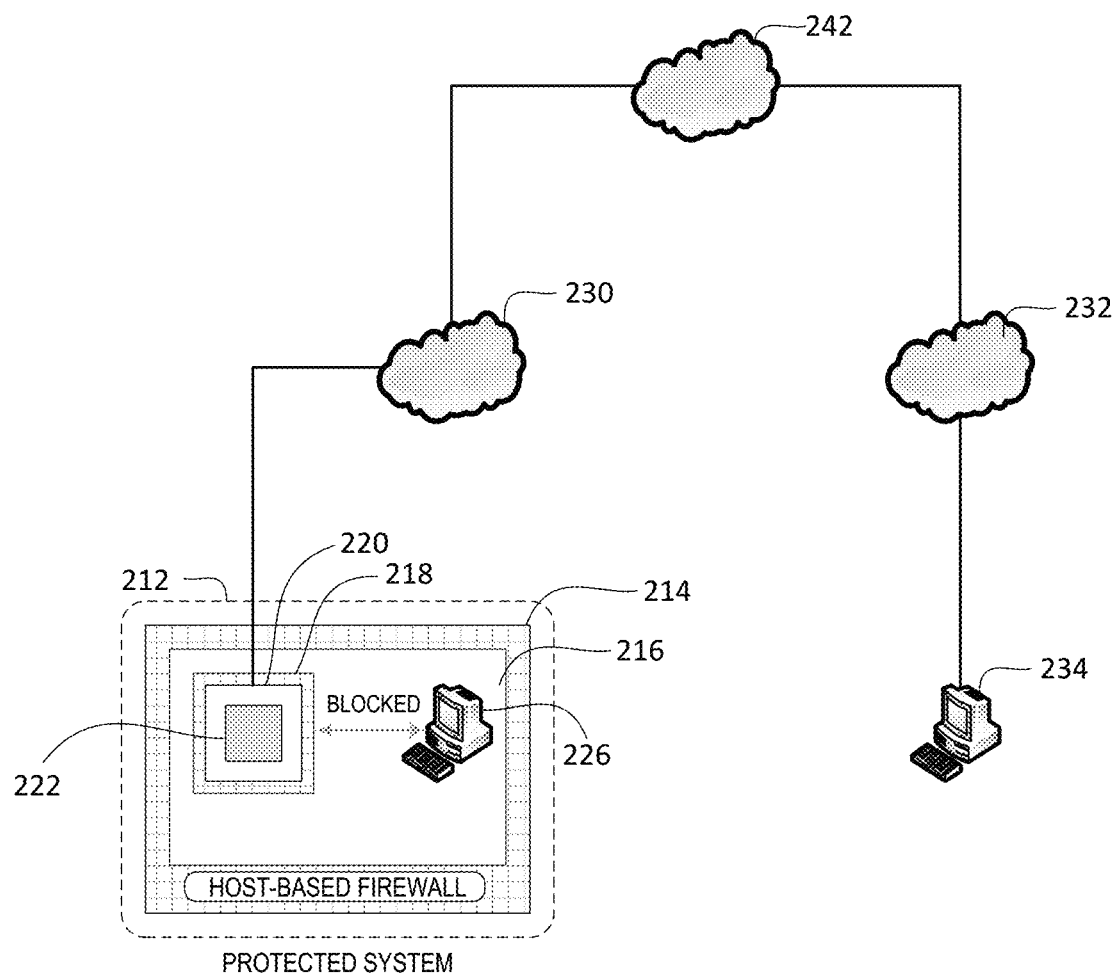
FIG. 2 depicts an example host computer system configured to participate in a software based meeting with one or more other host computer systems, the example host computer system using a sandbox based network isolation system.

FIG. 2 depicts an example host computer system 212 configured to participate in a software based meeting with one or more other host computer systems, the example host computer system 212 using a sandbox based network isolation system. The host computer system 212 may include a host-based firewall 214, an operating system 226, a sandboxed computing environment (e.g., an isolated computing environment) 220, an internal isolation firewall 218, and a workspace 216. The host computer system 212 may be any host computer system, such as a cell phone, a pager, a personal computer (PC), a laptop, a vehicle computer system, a kiosk computer system, a server, a workstation, a tablet, a smartphone, a router, a controller, a microcontroller, and/or any other processing and/or communication device. The host computer system 212 may be operatively connected with one or more user-accessible data entry devices, a display device viewable by a user, and/or a computer-accessible data storage. One or more application programs may run on the operating system 226.

As an example, the trusted host computer system 212 may be a PC, with 4 GB RAM and 146 GB hard disk computer-accessible storage, a monitor, a keyboard, and a mouse. The operating system 226 may be Windows-based, Linux-Based, Macintosh-based, and/or the like. The computer-accessible storage may store data corresponding to one or more software programs (e.g., computer-readable instructions) stored on the trusted host computer system 212 for common operation. The software programs may include word processing programs, accounting programs, remote connectivity programs, and/or other types of applications.

The host computer system 212 may be configured to isolate communication with untrusted network destinations. The host computer system 212 may isolate communication with untrusted network destinations using one or more of the host-based firewall 214, a border firewall (not shown), a web proxy (not shown), an internal isolation firewall 218, or a segregation of untrusted memory space.

The sandboxed computing environment 220 may include resources (e.g., a limited set of resources) allocated to operation of a sandbox container process. The sandboxed computing environment 220 may be enforced via the sandbox container process. The sandbox container process may be a security mechanism used to separate resources associated with the sandboxed computing environment 220 from other applications and/or processes that may be running on the workspace 216 of the host computer system 212. The sandboxed container process may be configured to enable one or more applications and/or processes (e.g., such as collaboration software application 222) being executed within the sandboxed computing environment 220 to access the resources allocated for operation of the sandbox container process. For example, the one or more applications and/or processes being operated within the sandboxed computing environment 220 may be allowed to access memory associated with the sandboxed computing environment 220. The memory associated with the sandboxed computing environment 220 may be separate from memory that is configured to enable storage and operation of the workspace 216.

The workspace 216 may include one or more processes operating within the operating system 226 that are not restricted by the sandbox container process. The operating system 226 of the host computer system 212 may include a set of resources configured to enable operation of the workspace 216 and the sandbox container process. One or more applications and/or processes (e.g., trusted applications) may be configured to run in the workspace 216.

The host computer system 212 may enable the host-based firewall 214. The host-based firewall 214 may prohibit and/or prevent communication (e.g., direct communication) between the host computer system 212 and other devices on the network 230. Each device on the network 230 may include a host-based firewall (e.g., such as the host-based firewall 214). The host-based firewall 214 may prohibit and/or prevent communication (e.g., direct communication) between the host computer system 212 and other devices within the network 230. For example, the host-based firewall 214 may be configured to block incoming traffic from the other devices within the network 230. The host-based firewall 214 may allow traffic received by the host computer system 212 via one or more predetermined devices and/or ports. For example, one or more devices (e.g., predetermined devices) on the network 230 may bypass the host-based firewall 214, for example, using a predetermined set of protocols and/or ports. The host-based firewall 214 may be configured to allow certain communication between the workspace 216 (e.g., via the trusted applications) and the network.

The host-based firewall 214 may be implemented using software and/or hardware. For example, the host-based firewall 214 may be implemented using software that is commercially available, for example, such as Symantec Endpoint Protection, MacAfee Host Based Security Systems, etc. The host-based firewall 214 may be implemented using software inherent in the operating system 226 of the trusted host computer system 212, for example the Windows operating system firewall. The host-based firewall 214 may be implemented using software for configuring and/or implementing restrictive ingress and/or egress policies on the host computer system 212.

The host computer system 212 may run the sandboxed computing environment 220. The sandboxed computing environment 220 may run within the operating system 226 of the host computer system 212. For example, the sandboxed computing environment 220 may be configured to run within a second memory space of the host computer system 212. A first memory space may be configured to enable storage and operation of a workspace configured to execute a first set of one or more applications and/or processes running on the operating system 226 of the host computer system 212. For example, the collaboration software application 222 may operate within the sandboxed computing environment 220. The sandboxed computing environment 220 may be prohibited from communicating with other devices within the network 230.

The collaboration software application 222 may enable the host computer system 212 to participate in a software and/or web-based meeting. The collaboration software application 222 may be configured to enable a device (e.g., a trusted device or an untrusted device) to view, via web protocols or other protocols, meeting data associated with the host computer system 212. The collaboration software application 222 may be configured to enable an untrusted device to present, via web protocols or other protocols, meeting data to the host computer system 212 and/or any other host computer systems (e.g., trusted or untrusted) that may be participating in a meeting via web traffic and/or other protocols. The collaboration software application 222 may be configured to permit an untrusted device to interact with the host computer system 212 via web protocols or other protocols. For example, the untrusted device may use the collaboration software application 222 to control a pointer device, a keyboard input, a cut/paste capability, and/or a file transfer capability on the host computer system 212. Controlling the host computer system may include, for example, viewing a display of, modifying, interacting with, uploading data to, and/or downloading data from the host computer system. Operating the collaboration software application 222 within the sandboxed computing environment 220 may restrict command and control between the host computing system 212 and the untrusted device to the sandboxed computing environment 220 and/or the untrusted memory space of the host computing device 212.

For example, host computer system 234 may be configured to interact with the host computer system 212 via the collaboration software application (e.g., multi-user interactive software application) 222. The host computer system 234 may execute an instance of a collaboration software application (e.g., such as the collaboration software application 222). The host computer system 234 may be connected to a disparate network 232. The disparate network 232 may be trusted or untrusted. The host computer system 234 may access the Internet 242 via the disparate network 232. The host computer system 212 and the host computer system 234 may communicate via the respective collaboration software applications running thereon. The host computer system 212 may allow the host computer system 234 to access the sandboxed computing environment 220. For example, the host computer system 212 may allow the host computer system 234 to access meeting data within the sandboxed computing environment 220. The host computer system 212 (e.g., the internal isolation firewall 218) may be configured to prevent the host computer system 234 from accessing the workspace 216.

If malware is transferred to the host computer system 212 due to interactions with the host computer system 234, the malware may be isolated to the sandboxed computing environment 220, which may make it difficult for the malware to infect the workspace 216 of the host computer system 212 and/or other devices on the network 230. For example, the sandbox container process may prevent the malware toolset from performing a reconnaissance of the host computer system 212 to assess what data is available from the host computer system 212, such as computing resources, files, network information, additional network connectivity, etc. The sandbox container process may prevent the malware toolset from performing a reconnaissance of the network 230, via the host computing device 212. A reconnaissance may be used, for example, to assess what data is available from the network 230, such as computing resources, files, network information, additional network connectivity, etc. The sandbox container process (e.g., the internal isolation firewall 218) may prevent the data on the host computer system 212 and/or the network 230 from being reported back to the host computer system 234, another device that may have sent the malware to the host computer system 212, and/or any other remote devices.

Browser solutions running within the workspace 216 of the host computer system 212 may be utilized for communication between the host computer system 212 and trusted network destinations. For example, the one or more applications or processes running within the workspace 216 of the host computer system 212 may enable access to the trusted network destinations.

The sandboxed computing environment 220 and/or the sandbox container process may be implemented using software and/or hardware. For example, the sandboxed computing environment 220 and/or the sandbox container process may be implemented using software that is commercially available, for example, such as Invincea Endpoint Protection, Tanium Endpoint Platform, Bromium Advanced Endpoint Security, etc.

The sandboxed computing environment 220 may provide separate and/or isolated memory space from the workspace 216 of the host computer system 212. For example, the sandboxed computing environment 220 may be enforced using a sandbox container process. The sandbox container process may segregate the workspace 216 from the sandboxed computing environment 220. The first memory space (e.g., the workspace memory) may enable storage and/or operation of the workspace 216. The operating system 226 may enable operation of the sandboxed computing environment 220. The second memory space may enable storage and/or operation of one or more applications and/or processes associated with the sandboxed computing environment 220. For example, the second memory space may be reserved for storage and/or operation of the applications and/or processes running within the sandboxed computing environment 220. The sandbox container process may isolate the first memory space and the second memory space. For example, the sandbox container process may enable the internal isolation firewall 218. The internal isolation firewall 218 may enforce a separation of the first and second memory spaces. For example, the internal isolation firewall 218 may allow a predefined set of processes to be executed within the sandboxed computing environment 220. The internal isolation firewall 218 may prevent execution, in the sandboxed computing environment 220, of any processes outside of the predefined set of processes. The second memory space may be referred to as a separate and/or isolated memory space. The sandbox container process may segregate the second memory space, any additional processes and/or memory usage required for usage of untrusted network destination related content during an established communication session. Separation and/or isolation of computer resources may be referred to as a virtual air gapped solution. The first memory space and the second memory space may be separate physical memory locations. The first memory space and the second memory space may be collocated on a physical memory.

If malware in a sandboxed computing environment 220 is able to access the resources, assets, and/or files of the operating system 226, the host computer system 212 may be considered infected and untrusted. For example, the malware may bypass the internal isolation firewall 218 via explicit user input. The host-based firewall 214 may prohibit the introduced malware from communicating with any other device on the network 230. For example, the host-based firewall 214 may be configured to block incoming traffic from the network 230.

Malware may be introduced to the operating system 226 from a source other than communication with the Internet 242. For example, malware may be introduced to the operating system 226 via an infected email, an infected USB memory stick, and/or another infected hardware device.

An infected and/or untrusted host computer system (e.g., regardless of the introduced malware's vector) may have no communication (e.g., direct communication) with the Internet 242. For example, the border firewall (not shown) may prevent the infected and/or untrusted host computer system from communicating with the Internet 242. Without a connection to (e.g., communication with) the Internet 242, the introduced malware may be prevented from performing many toolset functions described herein or any other function that an enslaved, infected and/or untrusted host computer system may perform. Without a connection to the Internet 242, the introduced malware may not be able to transfer any data from the infected and/or untrusted host computer system to the Internet 242.

The host computer system 212 and/or the network 230 may limit the adverse effects associated with a received malware. For example, the host computer system 212 and/or the network 230 may prevent the received malware from using its vector to communicate data from the host computer system 212.

Malware introduced to the operating system 226 of the host computer system 212 may be prevented from accessing one or more other participants of a meeting associated with the collaboration software application 222. For example, the internal isolation firewall 218 may prevent malware in the trusted memory space of the host computer system 212 from infecting the host computer system 234. The internal isolation firewall 218 may prevent malware in the trusted memory space of the host computer system 212 from initiating a data transfer to and/or from the host computer system 234 and/or another remote device. The internal isolation firewall 218 may be configured to prevent establishment of a communication channel for malware to interact with an untrusted device (e.g., such as the host computer system 234).

An author of the malware may not be aware of any level of efficacy of the introduced malware and/or its successful attack vector. The host computer system 212 and/or the network 230 may prevent data of an infected and/or untrusted host computer system that may have been compromised and/or collected by the malware from being communicated to the author of the malware. For example, the host computer system 212 may prevent communication between an infected and/or untrusted host computer system and the Internet 242 (e.g., the author of the malware via the Internet 242).

Figure 3:
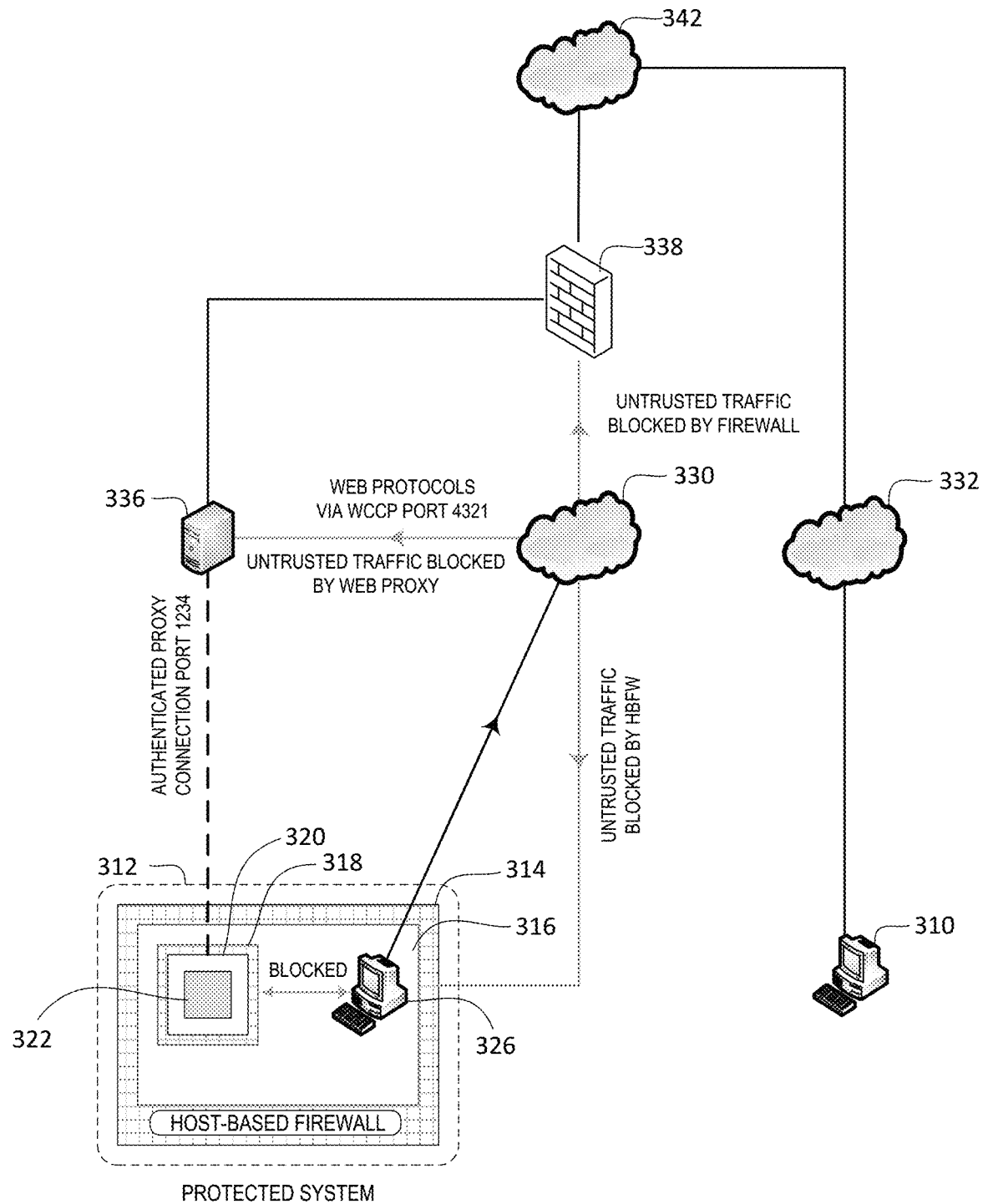
FIG. 3 depicts another example host computer system configured to participate in a software based meeting with one or more other host computer systems, the example host computer system using a sandbox based network isolation system.

FIG. 3 depicts an example host computer system 312 (e.g., such as the host computer system 212 shown in FIG. 2) configured to participate in a software based meeting with one or more other host computer systems, the example host computer system 312 using a sandbox based network isolation system. The host computer system 312 may be configured to connect to a network 330. The network 330 may be a local area network (LAN), a wide area network (WAN), a cellular network, a Wi-Fi network, a digital subscribers line (DSL) network, a cloud computing network, a data center, an ad-hoc network, a satellite network, a cable modem network, etc. The network 330 may include a plurality of physical and/or virtual devices. The network 330 may include a plurality of host computer systems. Each of the host computer systems may transmit electrical data signals to one or more other host computer systems on the network 330. The network 330 may send web traffic and/or other protocols (e.g., to support remote meeting software applications) to one or more untrusted network destinations using one or more of a border firewall 338 or a web proxy 336. For example, the network 330 may access the internet 342 and/or another host computer system 310 via the network 330, the border firewall 338, and/or the web proxy 336.

The host computer system 312 may include a host-based firewall 314, an operating system 326, a sandboxed computing environment 320, an internal isolation firewall 318, and a workspace 316. The host computer system 312 may be any host computer system, such as a cell phone, a pager, a personal computer (PC), a laptop, a vehicle computer system, a kiosk computer system, a server, a workstation, a tablet, a smartphone, a router, a controller, a microcontroller, and/or any other processing and/or communication device. The host computer system 312 may be operatively connected with one or more user-accessible data entry devices, a display device viewable by a user, and/or a computer-accessible data storage. One or more application programs may run on the operating system 326.

As an example, the trusted host computer system 312 may be a PC, with 4 GB RAM and 146 GB hard disk computer-accessible storage, a monitor, a keyboard, and a mouse. The operating system 326 may be Windows-based, Linux-Based, Macintosh-based, and/or the like. The computer-accessible storage may store data corresponding to one or more software programs (e.g., computer-readable instructions) stored on the trusted host computer system 312 for common operation. The software programs may include word processing programs, accounting programs, remote connectivity programs, and/or other types of applications.

The host computer system 312 may be configured to isolate communication with untrusted network destinations. The host computer system 312 may isolate communication with untrusted network destinations using one or more of the host-based firewall 314, a border firewall 338, a web proxy 336, an internal isolation firewall 318, or a segregation of untrusted memory space.

The host computer system 312 may enable a host-based firewall 314. The host-based firewall 314 may prohibit and/or prevent communication (e.g., direct communication) between the host computer system 312 and other devices connected to the network 330. The host-based firewall 314 may prohibit and/or prevent communication (e.g., direct communication) between the host computer system 312 and other devices within the network 330. For example, the host-based firewall 314 may be configured to block incoming traffic from the other devices within the network 330. The host-based firewall 314 may allow traffic to be received by the host computer system 312 via one or more predetermined devices and/or ports. For example, one or more devices (e.g., predetermined devices) on the network 330 may bypass the host-based firewall 314, for example, using a predetermined set of protocols and/or ports.

The host-based firewall 314 may be implemented using software and/or hardware. For example, the host-based firewall 314 may be implemented using software that is commercially available, for example, such as Symantec Endpoint Protection, MacAfee Host Based Security Systems, etc. The host-based firewall 314 may be implemented using software inherent in the operating system 326 of the host computer system 312, for example the Windows operating system firewall. The host-based firewall 314 may be implemented using software for configuring and/or implementing restrictive ingress and/or egress policies on the host computer system 312.

The sandboxed computing environment 320 may include resources (e.g., a limited set of resources) allocated to operation of a sandbox container process. The sandboxed computing environment 320 may be enforced via the sandbox container process. The sandbox container process may be a security mechanism used to separate resources associated with the sandboxed computing environment 320 from other applications and/or processes that may be running on the workspace 316 of the host computer system 312. The sandboxed container process may be configured to enable one or more applications and/or processes (e.g., such as collaboration software application 322) being executed within the sandboxed computing environment 320 to access the resources allocated for operation of the sandbox container process. For example, the one or more applications and/or processes being operated within the sandboxed computing environment 320 may be allowed to access memory associated with the sandboxed computing environment 320. The memory associated with the sandboxed computing environment 320 may be separate from memory that is configured to enable storage and operation of the workspace 316.

The workspace 316 may include one or more processes operating within the operating system 326 that are not restricted by the sandbox container process. The operating system 326 of the host computer system 312 may include a set of resources configured to enable operation of the workspace 316 and the sandbox container process.

The host computer system 312 may run the sandboxed computing environment 320. The sandboxed computing environment 320 may run within the operating system 326 of the host computer system 312. For example, the sandboxed computing environment 320 may be configured to run within a second memory space of the host computer system 312. A first memory space may be configured to enable storage and operation of a workspace configured to execute a first set of one or more applications and/or processes running on the operating system 326 of the host computer system 312. For example, the collaboration software application 322 may operate within the sandboxed computing environment 320. The sandboxed computing environment 320 may be prohibited from communicating with other devices within the network 330.

The collaboration software application 322 may be configured to enable a device (e.g., a trusted device or an untrusted device) to view, via web protocols or other protocols, meeting data associated with the host computer system 312. The collaboration software application 322 may be configured to enable an untrusted device to present, via web protocols or other protocols, meeting data to the host computer system 312 and/or any other host computer systems (e.g., trusted or untrusted) that may be participating in a meeting via web traffic and/or other protocols. The collaboration software application 322 may be configured to permit an untrusted device to interact with the host computer system 312 via web protocols or other protocols. For example, the untrusted device may use the collaboration software application 322 to control a pointer device, a keyboard input, a cut/paste capability, and/or a file transfer capability on the host computer system 312. Controlling the host computer system may include, for example, viewing a display of, modifying, interacting with, uploading data to, and/or downloading data from the host computer system. Operating the collaboration software application 322 within the sandboxed computing environment 320 may restrict command and control between the host computing system 312 and the untrusted device to the sandboxed computing environment 320 and/or the untrusted memory space of the host computing device 312.

For example, host computer system 310 may be configured to interact with the host computer system 312 via the collaboration software application 322. The host computer system 310 may execute an instance of a collaboration software application (e.g., such as the collaboration software application 322). The host computer system 310 may be connected to a disparate network 332. The disparate network 332 may be trusted or untrusted. The host computer system 310 may access the Internet 342 via the disparate network 332. The host computer system 312 and the host computer system 310 may communicate via the respective collaboration software applications running thereon. The host computer system 312 may allow the host computer system 310 to access the sandboxed computing environment 320. For example, the host computer system 312 may allow the host computer system 310 to access meeting data within the sandboxed computing environment 320. The host computer system 312 (e.g., the internal isolation firewall 318) may be configured to prevent the host computer system 310 from accessing the workspace 316.

If malware is transferred to the host computer system 312 due to interactions with the host computer system 310, the malware may be isolated to the sandboxed computing environment 320, which may make it difficult for the malware to infect the workspace 316 of the host computer system 312 and/or other devices on the network 330. For example, the sandbox container process may prevent the malware toolset from performing a reconnaissance of the host computer system 312 to assess what data is available from the host computer system 312, such as computing resources, files, network information, additional network connectivity, etc. The sandbox container process may prevent the malware toolset from performing a reconnaissance of the network 330, for example, via the host computing device 312. A reconnaissance of the network 330 may be used to assess what data is available from the network 330, such as computing resources, files, network information, additional network connectivity, etc The sandbox container process (e.g., the internal isolation firewall 318) may prevent the data on the host computer system 312 and/or the network 330 from being reported back to the host computer system 310, another device that may have sent the malware to the host computer system 312, and/or any other remote devices.

Browser solutions running within the workspace 316 of the host computer system 312 may be utilized for communication between the host computer system 312 and trusted network destinations. For example, the one or more applications or processes running within the workspace 316 of the host computer system 312 may enable access to the trusted network destinations.

The border firewall 338 may enable isolation of the host computer system 312 (e.g., the workspace 316) from one or more untrusted network destinations. The border firewall 338 may be configured to restrict traffic to the untrusted network destinations (e.g., the Internet 242) from the web proxy 336 and/or the network 330. The host computer systems 312 may access a whitelisted web server and/or an untrusted web server via a web proxy device 336, for example, via the border firewall 338. The border firewall 338 may be configured to block communication between the host computer system 312 and one or more untrusted network destinations, for example, the Internet 342. For example, the border firewall 338 may be configured to block untrusted traffic that is not routed through the web proxy 336. The border firewall 338 may be configured to block untrusted traffic that is not received from one or more predetermined devices. The border firewall 338 may be configured to block untrusted traffic that is not received via one or more predetermined network ports.

Figure 4:
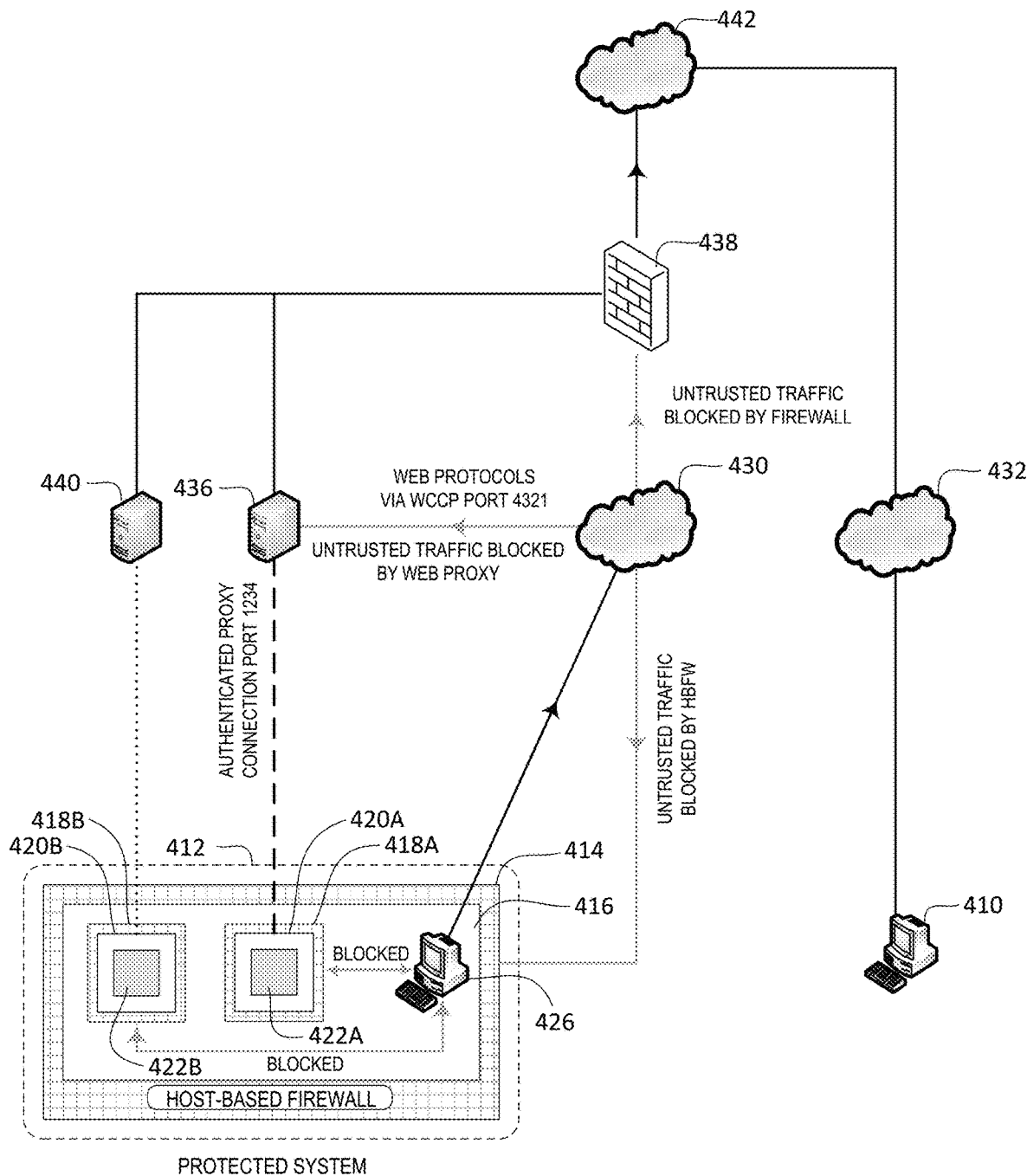
FIG. 4 depicts an example host computer system configured to enable separate sandboxed computing environments, the example host computer system using a sandbox based network isolation system.

FIG. 4 depicts an example host computer system 412 (e.g., such as the host computer system 212 shown in FIG. 2 and/or the host computer system 312 shown in FIG. 3) configured to enable separate sandboxed computing environments 420A, 420B, the example host computer system 412 using a sandbox based network isolation system. The host computer system 412 may be configured to connect to a network 430. The network 430 may be a local area network (LAN), a wide area network (WAN), a cellular network, a Wi-Fi network, a digital subscribers line (DSL) network, a cloud computing network, a data center, an ad-hoc network, a satellite network, a cable modem network, etc. The network 430 may include a plurality of physical and/or virtual devices. The network 430 may include a plurality of host computer systems. Each of the host computer systems may transmit electrical data signals to one or more other host computer systems on the network 430. The network 430 may send web traffic to one or more untrusted network destinations using one or more of a border firewall 438, a web proxy 436, or a termination device 440. For example, the network 430 may access the internet 442 and/or another host computer system 410 via the network 430, the border firewall 438, the web proxy 436, and/or the termination device 440.

The host computer system 412 may include a host-based firewall 414, an operating system 426, a first sandboxed computing environment 420A, a second sandboxed computing environment 420B, a first internal isolation firewall 418A, a second internal isolation firewall 418B, and a workspace 416. The host computer system 412 may be any host computer system, such as a cell phone, a pager, a personal computer (PC), a laptop, a vehicle computer system, a kiosk computer system, a server, a workstation, a tablet, a smartphone, a router, a controller, a microcontroller, and/or any other processing and/or communication device. The host computer system 412 may be operatively connected with one or more user-accessible data entry devices, a display device viewable by a user, and/or a computer-accessible data storage. One or more application programs may run on the operating system 426.

As an example, the trusted host computer system 412 may be a PC, with 4 GB RAM and 146 GB hard disk computer-accessible storage, a monitor, a keyboard, and a mouse. The operating system 426 may be Windows-based, Linux-Based, Macintosh-based, and/or the like. The computer-accessible storage may store data corresponding to one or more software programs (e.g., computer-readable instructions) stored on the trusted host computer system 412 for common operation. The software programs may include word processing programs, accounting programs, remote connectivity programs, and/or other types of applications.

The host computer system 412 may be configured to isolate communication with untrusted network destinations. The host computer system 412 may isolate communication with untrusted network destinations using one or more of the host-based firewall 414, the border firewall 438, the web proxy 436, the termination device 440, the first internal isolation firewall 418A, the second internal isolation firewall 418B, or a segregation of untrusted memory space.

The host computer system 412 may enable a host-based firewall 414. The host-based firewall 414 may prohibit and/or prevent communication (e.g., direct communication) between the host computer system 412 and other devices connected to the network 430. The host-based firewall 414 may prohibit and/or prevent communication (e.g., direct communication) between the host computer system 412 and other devices within the network 430. For example, the host-based firewall 414 may be configured to block incoming traffic from the other devices within the network 430. The host-based firewall 414 may allow traffic to be received by the host computer system 412 via one or more predetermined devices and/or ports. For example, one or more devices (e.g., predetermined devices) on the network 430 may bypass the host-based firewall 414, for example, using a predetermined set of protocols and/or ports.

The host-based firewall 414 may be implemented using software and/or hardware. For example, the host-based firewall 414 may be implemented using software that is commercially available, for example, such as Symantec Endpoint Protection, MacAfee Host Based Security Systems, etc. The host-based firewall 414 may be implemented using software inherent in the operating system 426 of the host computer system 412, for example the Windows operating system firewall. The host-based firewall 414 may be implemented using software for configuring and/or implementing restrictive ingress and/or egress policies on the host computer system 412.

The workspace 416 may include one or more processes operating within the operating system 426 that are not restricted by the sandbox container process. The operating system 426 of the host computer system 412 may include a set of resources configured to enable operation of the workspace 416 and the sandbox container processes. A first memory space may be configured to enable storage and operation of a workspace configured to execute a first set of one or more applications and/or processes running on the operating system 426 of the host computer system 412.

The host computer system 412 may enable a plurality of sandboxed computing environments, for example, such as sandboxed computing environments 420A, 420B. For example, the host computer system 412 may run a first sandboxed computing environment 420A and a second sandboxed computing environment 420B. The host computer system may enable an untrusted memory space for each respective sandboxed computing environment. For example, the first sandboxed computing environment 420A may be configured to run within a second memory space of the host computer system 412 and the second sandboxed computing environment 420B may be configured to run within a third memory space of the host computer system 412. Each of the plurality of sandboxed computing environments may be configured for a different type of application. For example, the first sandboxed computing environment 420A may be configured to enable a browser application 422A to operate therein. As another example, the second sandboxed computing environment 420B may be configured to enable a collaboration software application 422B to operate therein.

The first sandboxed computing environment 420A may include resources (e.g., a limited set of resources) allocated to operation of a first sandbox container process. The first sandboxed computing environment 420A may be enforced via the first sandbox container process. The sandbox container process may be a security mechanism used to separate resources associated with the first sandboxed computing environment 420A from other applications and/or processes that may be running on any other memory space, for example the workspace 416 of the host computer system 412. The sandboxed container process may be configured to enable one or more applications and/or processes (e.g., such as a browser application 422A) being executed within the first sandboxed computing environment 420A to access the resources allocated for operation of the first sandbox container process. For example, the one or more applications and/or processes being operated within the first sandboxed computing environment 420A may be allowed to access memory associated with the first sandboxed computing environment 420A. The memory associated with the first sandboxed computing environment 420A may be separate from memory that is configured to enable storage and operation of the workspace 416 and/or any other sandbox computing environments, for example 420B. Separation of the first sandboxed computing environment 420A and the workspace 416 and/or any other sandbox computing environments, for example 420B may be enforced by a first internal isolation firewall 418A.

The second sandboxed computing environment 420B may include resources (e.g., a limited set of resources) allocated to operation of a second sandbox container process. The second sandboxed computing environment 420B may be enforced via the second sandbox container process. The second sandbox container process may be a security mechanism used to separate resources associated with the second sandboxed computing environment 420B from other applications and/or processes that may be running on any other memory space, for example the workspace 416 of the host computer system 412. The second sandboxed container process may be configured to enable one or more applications and/or processes (e.g., such as a collaboration software application 422B) being executed within the second sandboxed computing environment 420B to access the resources allocated for operation of the second sandbox container process. For example, the one or more applications and/or processes being operated within the second sandboxed computing environment 420B may be allowed to access memory associated with the second sandboxed computing environment 420B. The memory associated with the second sandboxed computing environment 420B may be separate from memory that is configured to enable storage and operation of the workspace 416 and/or any other sandbox computing environments, for example 420A. Separation of the second sandboxed computing environment 420B and the workspace 416 and/or any other sandbox computing environments, for example 420A may be enforced by a second internal isolation firewall 418B.

The first internal isolation firewall 418A and/or the second internal isolation firewall 418B may enforce separation of the first sandboxed computing environment 420A and the second sandboxed computing environment 420B. For example, the first internal isolation firewall 418A and/or the second internal isolation firewall 418B may prevent first sandboxed computing environment 420A and the second sandboxed computing environment 420B from exchanging data.

The collaboration software application 422B may be configured to enable a device (e.g., a trusted device or an untrusted device) to view, via web protocols or other protocols, meeting data associated with the host computer system 412. The collaboration software application 422B may be configured to enable an untrusted device to present, via web protocols or other protocols, meeting data to the host computer system 412 and/or any other host computer systems (e.g., trusted or untrusted) that may be participating in a meeting via web traffic and/or other protocols. The collaboration software application 422B may be configured to permit an untrusted device to interact with the host computer system 412 via web protocols or other protocols. For example, the untrusted device may use the collaboration software application 422B to control a pointer device, a keyboard input, a cut/paste capability, and/or a file transfer capability on the host computer system 412. Operating the collaboration software application 422B within the second sandboxed computing environment 420B may restrict command and control between the host computing system 412 and the untrusted device to the sandboxed computing environment 420B and/or the untrusted memory space of the host computing device 412.

For example, host computer system 410 may be configured to interact with the host computer system 412 via the collaboration software application 422B. The host computer system 410 may execute an instance of a collaboration software application (e.g., such as the collaboration software application 422B). The host computer system 410 may be connected to a disparate network 432. The disparate network 432 may be trusted or untrusted. The host computer system 410 may access the Internet 442 via the disparate network 432. The host computer system 412 and the host computer system 410 may communicate via the respective collaboration software applications running thereon. The host computer system 412 may allow the host computer system 410 to access the second sandboxed computing environment 420B. For example, the host computer system 412 may allow the host computer system 410 to access meeting data within the second sandboxed computing environment 420B. The host computer system 412 (e.g., the second internal isolation firewall 418B) may be configured to prevent the host computer system 410 from accessing the workspace 416. The host computer system 412 may be configured to prevent the host computer system 410 from accessing any other sandbox computing environment operating on the host computer system 412. Each sandboxed computing environment operation on the host computer system 412 may be protected by a respective internal isolation firewall. For example, the respective internal isolation firewalls may prevent the host computer system 410 from accessing any of the sandboxed computing environments operating on the host computer system 412.

The termination device 440 may enable access to a public or private network. The termination device 440 may be associated with the collaboration software application 422B. The termination device 440 may be located at the edge of the public or private network and may enable remote access to the public or private network. The termination device 440 may provide authentication associated with the collaboration software application 422B. The termination device 440 may enable access to the second sandboxed computing environment 420B. For example, the second sandboxed computing environment 420B may authenticate with the termination device. The host computer system 412 may communicate with the host computer system 410 via the termination device 440, the border firewall 438, the Internet 442, and/or the disparate network 432.

If malware is transferred to the host computer system 412 due to interactions with the host computer system 410, the malware may be isolated to the second sandboxed computing environment 420B, which may make it difficult for the malware to infect the workspace 416 of the host computer system 412 and/or other devices on the network 430. For example, the second sandbox container process may prevent the malware toolset from performing a reconnaissance of the host computer system 412 to assess what data is available from the host computer system 412, such as computing resources, files, network information, additional network connectivity, etc. The second sandbox container process (e.g., the second internal isolation firewall 418B) may prevent the data on the host computer system 412 and/or the network 430 from being reported back to the host computer system 410, another device that may have sent the malware to the host computer system 412, and/or any other remote devices. The sandbox container process may prevent the malware toolset from performing a reconnaissance of the network 430, for example, via host computing device 412. A reconnaissance of the network 430 may be used to assess what data is available from the network 430, such as computing resources, files, network information, additional network connectivity, etc Browser solutions running within the workspace 416 of the host computer system 412 may be utilized for communication between the host computer system 412 and trusted network destinations. For example, the one or more applications or processes running within the workspace 416 of the host computer system 412 may enable access to the trusted network destinations.

The border firewall 438 may enable isolation of the host computer system 412 (e.g., the workspace 416) from one or more untrusted network destinations. The border firewall 438 may be configured to restrict traffic to the untrusted network destinations (e.g., the Internet 442) from the web proxy 436 and/or the network 430. The host computer systems 412 may access a whitelisted web server and/or an untrusted web server via a web proxy device 436, for example, via the border firewall 438. The border firewall 438 may be configured to block communication between the host computer system 412 and one or more untrusted network destinations, for example, the Internet 442. For example, the border firewall 438 may be configured to block untrusted traffic that is not routed through the web proxy 436. The border firewall 438 may be configured to block untrusted traffic that is not received from one or more predetermined devices. The border firewall 438 may be configured to block untrusted traffic that is not received via one or more predetermined network ports.

The terms used herein should be seen to be terms of description rather than of limitation. It is understood that those of skill in the art with this disclosure may devise alternatives, modifications, or variations of the principles of the invention. It is intended that all such alternatives, modifications, or variations be considered as within the spirit and scope of this invention, as defined by the following claims.

Embodiments may take the form of a tangible computer-usable or computer-readable medium providing program code for use by or in connection with a computer or any instruction execution system. Examples of a computer-usable or computer-readable medium include tangible computer media such as semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. A processor may be configured to execute instructions stored in memory to perform the various functions and/or functional modules described herein.

What is claimed:

1. A system comprising:
a memory; and
a processor configured to:
  implement a workspace that uses a host operating system, wherein the workspace enables operation of a first set of one or more applications or processes via a first memory space;
  implement an isolated computing environment that uses the host operating system, wherein the isolated computing environment enables operation of a second set of one or more applications or processes via a second memory space, and wherein the second set of one or more applications or processes comprises a multi-user interactive software application;
  isolate the isolated computing environment from the workspace using an internal isolation firewall;
  authenticate the isolated computing environment with an authentication device; and
  send data to an untrusted destination from the multi-user interactive software application via a proxy device when the isolated computing environment has been authenticated.

2. The system of claim 1, wherein the multi-user interactive software application allows a remote machine to control an application or a process of the second set of one or more applications or processes running in the isolated computing environment, wherein controlling the application or process comprises at least one of viewing, interacting with, modifying, uploading data to, or downloading data from the application or the process.

3. The system of claim 1, wherein the multi-user interactive software application allows a remote device to control one or more of a pointer device, a keyboard input, or a display of the system.

4. The system of claim 1, wherein the system is connected to a network, the network corresponding to one or more of a local area network (LAN), a wide area network (WAN), a cellular network, a Wi-Fi network, a digital subscribers line (DSL) network, a cloud computing network, a data center, or a satellite network.

5. The system of claim 4, wherein the processor is further configured to:
implement a host-based firewall, wherein the host-based firewall isolates the system from communicating with one or more other devices on the network.

6. The system of claim 5, wherein the host-based firewall blocks incoming communications from the network that are sent to the workspace.

7. The system of claim 4, wherein the processor is further configured to:
run one or more trusted applications in the first memory space, and wherein the one or more trusted applications communicate with one or more trusted machines via the network.

8. The system of claim 1, wherein the internal isolation firewall prompts a user of the system to allow communication between the first memory space and the second memory space.

9. A method comprising:
implementing a workspace that uses a host operating system, wherein the workspace enables operation of a first set of one or more applications or processes via a first memory space;
implementing an isolated computing environment that uses the host operating system, wherein the isolated computing environment enables operation of a second set of one or more applications or processes via a second memory space, wherein the second set of one or more applications or processes comprises a multi-user interactive software application;
isolating the isolated computing environment from the workspace using an internal isolation firewall;
authenticating the isolated computing environment with an authentication device; and
sending data to an untrusted destination from the multi-user interactive software application via a proxy device when the isolated computing environment has been authenticated.

10. The method of claim 9, wherein the multi-user interactive software application allows a remote machine to control an application or a process of the second set of one or more applications or processes running in the isolated computing environment, wherein controlling the application or process comprises at least one of viewing, interacting with, modifying, uploading data to, or downloading data from the application or the process.

11. The method of claim 9, wherein the multi-user interactive software application allows a remote device to control one or more of a pointer device, a keyboard input, or a display of the isolated computing environment.

12. The method of claim 9, further comprising connecting to a network, the network corresponding to one or more of a local area network (LAN), a wide area network (WAN), a cellular network, a Wi-Fi network, a digital subscribers line (DSL) network, a cloud computing network, a data center, or a satellite network.

13. The method of claim 12, further comprising:
implementing a host-based firewall, wherein the host-based firewall isolates the first memory space and the second memory space from communicating with one or more devices on the network.

14. The method of claim 13, wherein the host-based firewall blocks incoming communications from the network that are sent to the workspace.

15. The method of claim 12, further comprising:
running one or more trusted applications in the first memory space, wherein the one or more trusted applications communicate with one or more trusted machines via the network.

16. The method of claim 9, wherein the internal isolation firewall prompts a user of the workspace to allow communication between the first memory space and the second memory space.

* * * * *